No. 882,743. PATENTED MAR. 24, 1908.
T. CARROLL.
COMBINATION WAGON OR OTHER VEHICLE.
APPLICATION FILED APR. 11, 1906.

5 SHEETS—SHEET 1.

Witnesses:
C. C. Holly.
J. Townsend.

Inventor.
Timothy Carroll,
by James R. Townsend
his atty

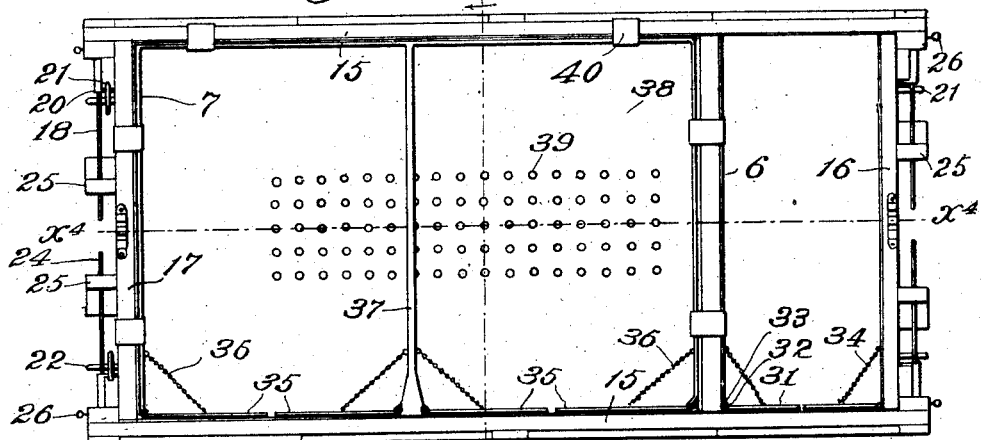
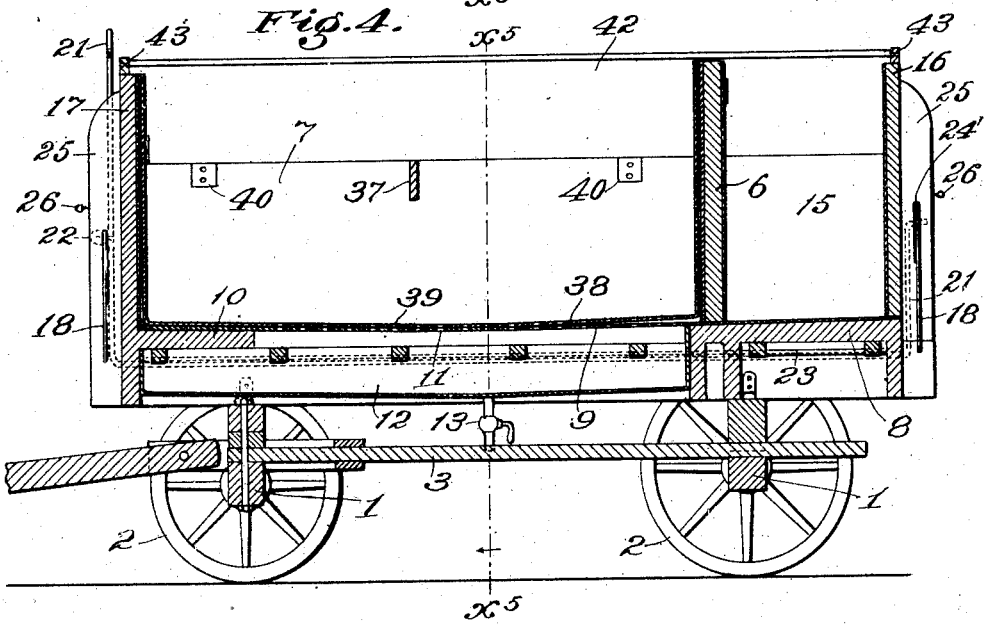

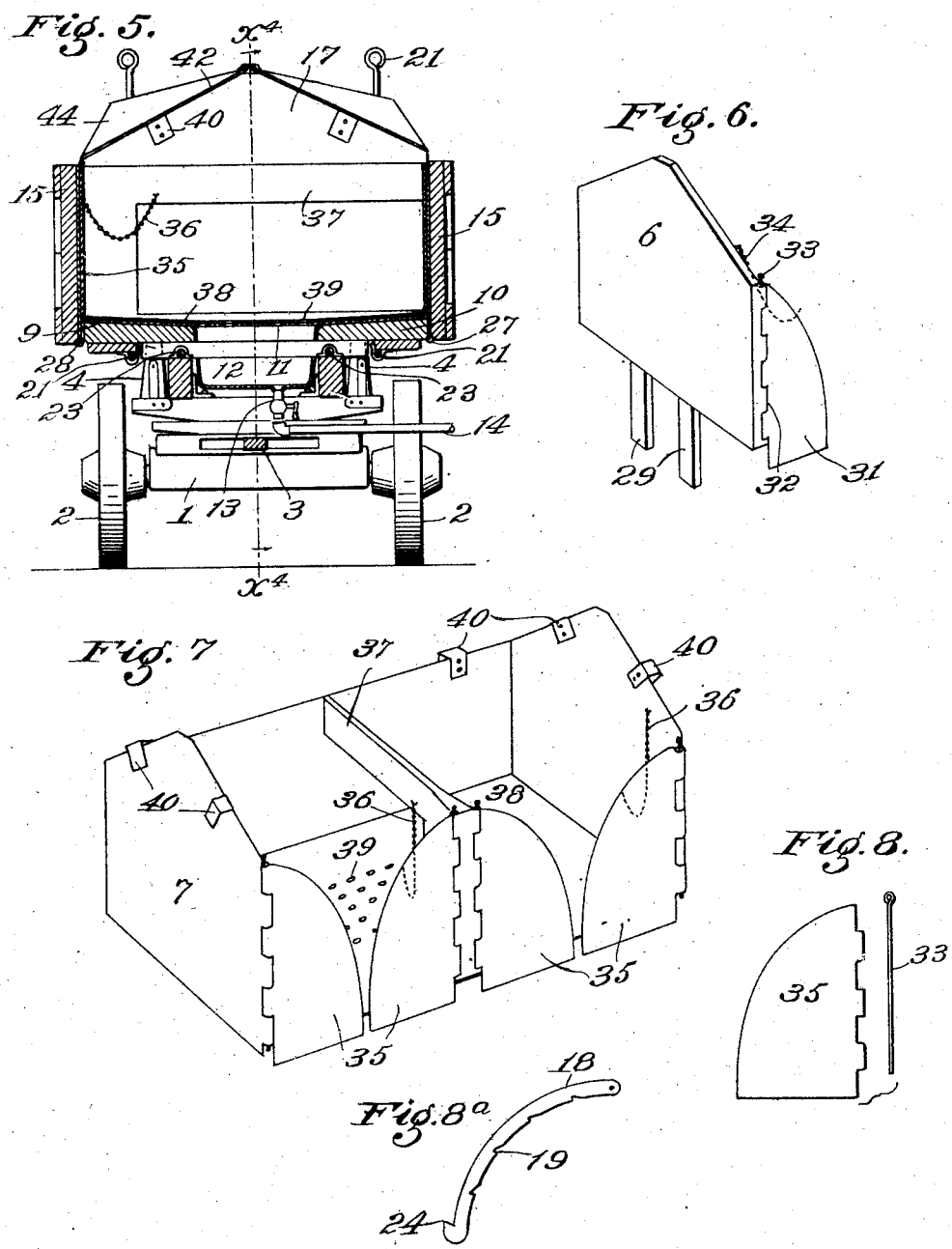

No. 882,743. PATENTED MAR. 24, 1908.
T. CARROLL.
COMBINATION WAGON OR OTHER VEHICLE.
APPLICATION FILED APR. 11, 1906.
5 SHEETS—SHEET 4.
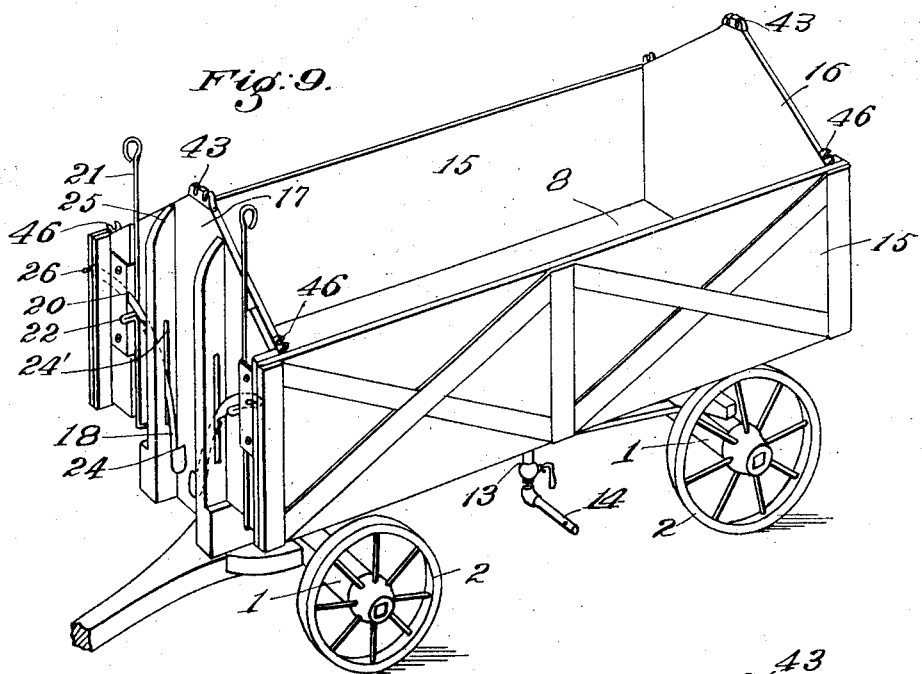
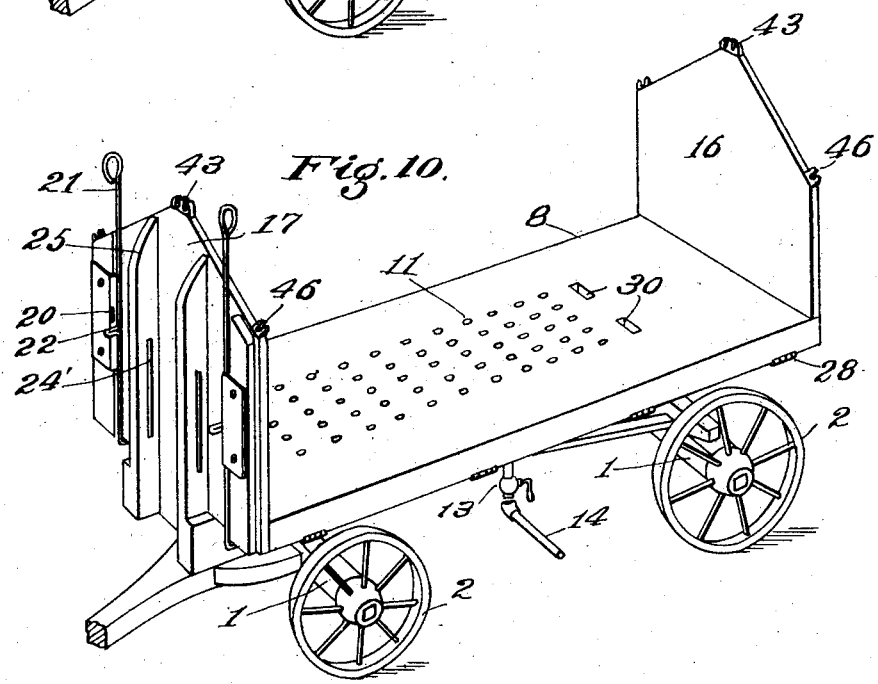
Witnesses:
C. C. Holly
J. Townsend
Inventor:
Timothy Carroll.
by James R. Townsend
his Atty No. 882,743. PATENTED MAR. 24, 1908.
T. CARROLL.
COMBINATION WAGON OR OTHER VEHICLE.
APPLICATION FILED APR. 11, 1906.

5 SHEETS—SHEET 5.

Witnesses:
C. C. Holly.
J. Townsend.

Inventor,
Timothy Carroll.
by James R. Townsend
his atty.

THE NORRIS PETERS CO., WASHINGTON, D. C.

UNITED STATES PATENT OFFICE.

TIMOTHY CARROLL, OF ANAHEIM, CALIFORNIA.

COMBINATION WAGON OR OTHER VEHICLE.

No. 882,743.

Specification of Letters Patent.

Patented March 24, 1908.

Application filed April 11, 1906. Serial No. 311,056.

*To all whom it may concern:*

Be it known that I, TIMOTHY CARROLL, a citizen of the United States, residing at Anaheim, in the county of Orange and State of California, have invented a new and useful Combination Wagon or other Vehicle, of which the following is a specification.

This invention relates to vehicles, and has particular reference to dumping vehicles.

An object of this invention is to provide a vehicle for the transportation of commodities in bulk, and which is so designed as to allow of the transformation thereof into an ordinary platform vehicle by simply removing the walls therefrom.

The invention about to be described is designed for use as a railway car or other vehicle, but for convenience and to avoid repetition I shall hereinafter refer only to wagons, it being understood that the term is intended to include railway cars and all vehicles to which the present device is susceptible of use.

With these and other objects, not specifically mentioned herein, in view, this invention consists in features and details of construction, separately and in combination, as will be described in connection with the accompanying drawings, and then be more particularly pointed out in the claims.

Figure 1:
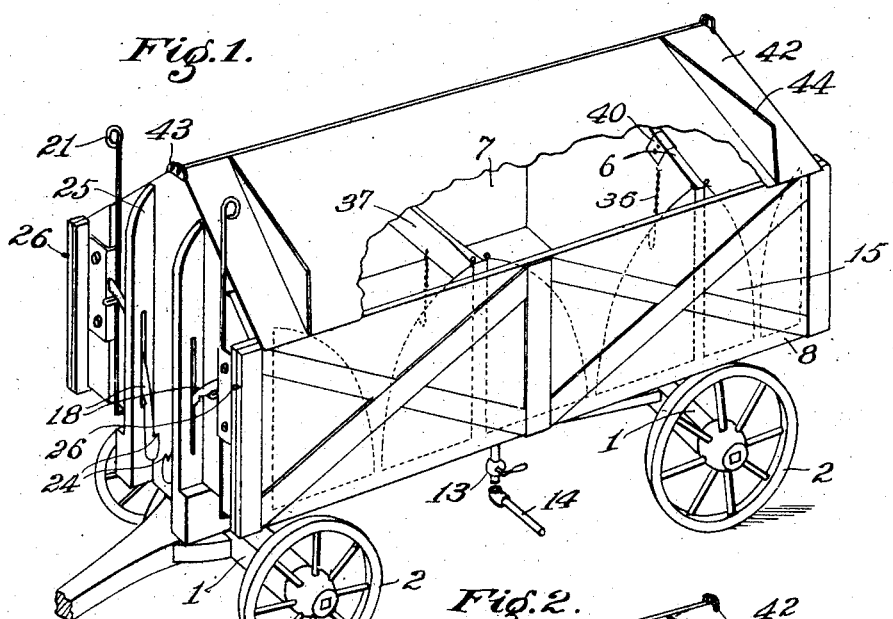
Figure 2:
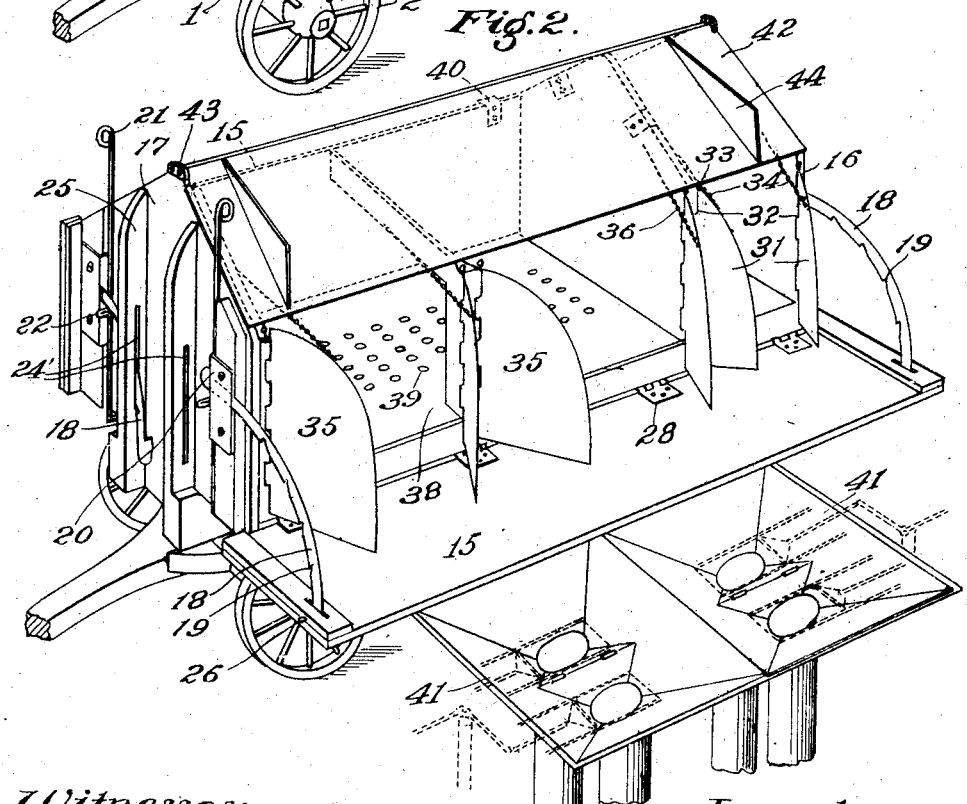
Figure 12:
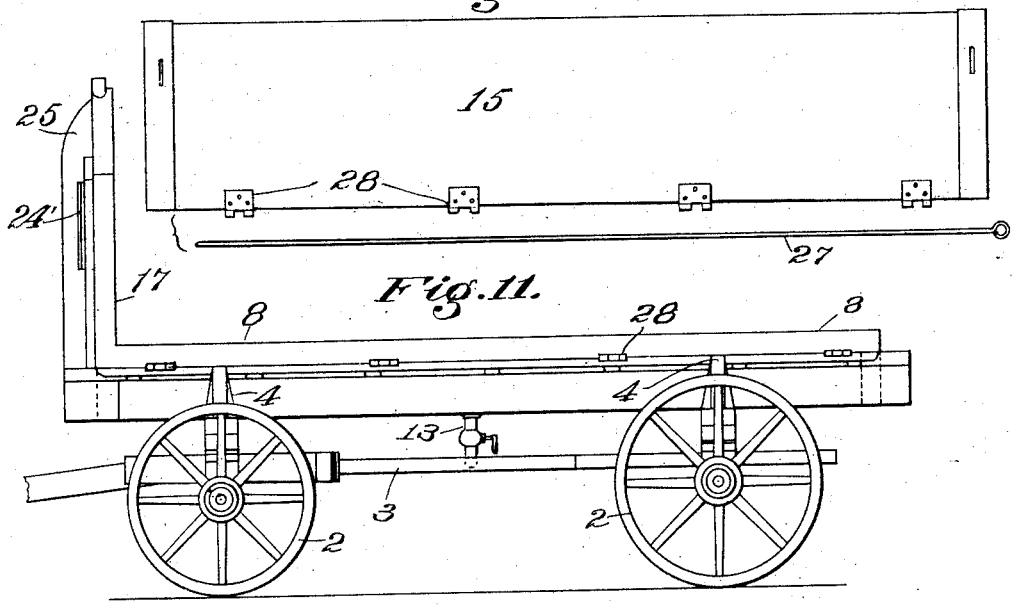
Figure 11:
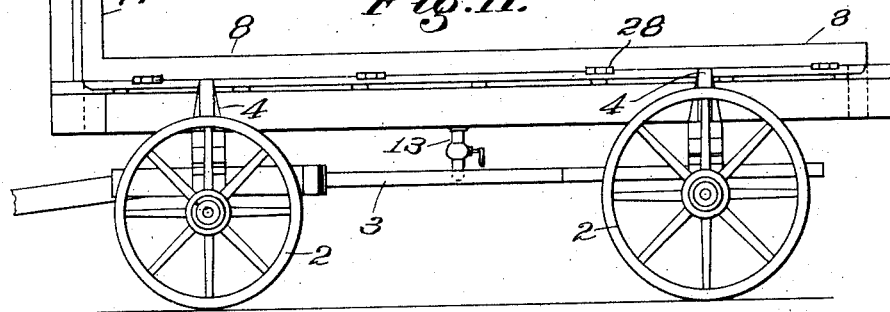
Figure 13:
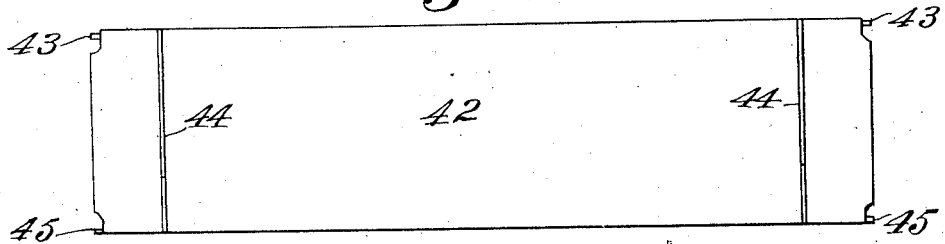
Figure 14:
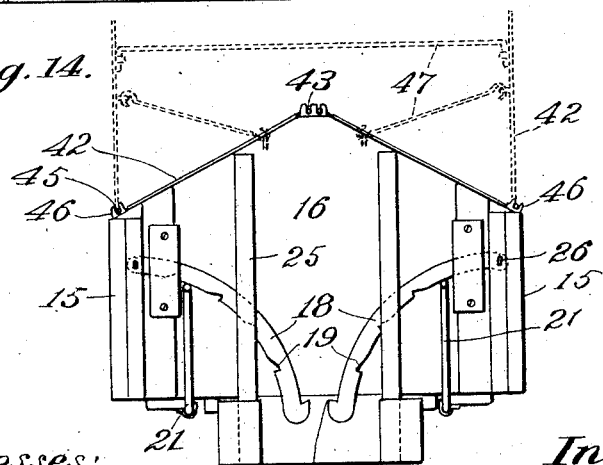

The accompanying drawings illustrate the invention, and referring to the same:

Figure 1 is a perspective view of a wagon embodying this invention with all of the parts adjusted to form a garbage wagon in its closed position. A portion of the cover is broken to expose interior construction. Dotted lines indicate the guides. Fig. 2 shows the same wagon in its dumped position. Fig. 3 is a plan of the wagon with all parts shown in Fig. 1, except the cover, in place. Fig. 4 is a longitudinal section on line $x^4$—$x^4$, Figs. 3 and 5. Fig. 5 is a cross section on line $x^5$—$x^5$, Figs. 3 and 4. Fig. 6 is a view of the dry compartment partition. Fig. 7 is a perspective view of the garbage tank detached. Fig. 8 is a view of one of the guides and pin detached. Fig. 8ª is a detail of one of the arms. Fig. 9 is a view of the wagon after the garbage tank and dry compartment partition have been removed. Fig. 10 is a view of the wagon as arranged for a mere platform wagon. Fig. 11 is the wagon with everything removed. Fig. 12 is the side removed. Fig. 13 is one of the covers. Fig. 14 is the end board.

In the drawings, 1 represents a pair of axles having journaled thereon wheels 2, the two axles being joined together in the usual manner by a cross-beam 3, which with the axles and wheels, forms the frame of the vehicle. A plurality of uprights 4 are secured to the frame-work and are arranged to accommodate the bed 8. Said bed is composed of a plurality of separable partitions or sections, shown at 6 and 7, the said sections being mounted upon the bed 8 of the vehicle. Said bed 8 is provided with a lining 9 which is perforated in certain parts thereof, or if desired, throughout the entire surface thereof, the frame portion 10 of the bed being provided with an opening corresponding to the perforated portion of the lining. Beneath said bed and in communication with the openings 11 of the lining, is a tank 12, having an outlet 13, extending along nearly the entire bottom portion of said bed 8. The object of this tank is to receive the drainage emanating from garbage or other saturated products, as well as to receive and store juices from fruits which are placed in the wagon or vehicle for shipment. The perforated portion 11 of said lining 9 is preferably concave in order to insure easier collection of liquids and juices issuing from the products contained in the vehicle. The outlet 13 is provided on the under portion of said tank 12 and serves to discharge the collected fluids from the tank, the tank itself being preferably positioned on an inclined plane so as to facilitate the travel of the liquids. A pipe 14 may be connected to said faucet 13, in which case the said pipe would extend at right angles to said faucet and away from the support of the vehicle body; the purport of this arrangement being to discharge the liquids from the tank 12 either into a sewer or into suitable troughs, or into evaporating tanks of a crematory. Hinged to the bed of said vehicle are a plurality of walls 15 designed to swing outwardly away from the vertical position of said bed, as shown in Fig. 2, and which serve to make substantially a rectangular closure for the vehicle, in connection with the rear portion 16 and the forward portion 17. Into the receptacle thus formed by these walls, the materials, products, or commodities to be transported, are placed, and in the case of garbage, the undesirable liquids are allowed to drain off through the perforations 11 into the tank below, thus leaving the garbage in the vehicle-body practically dry when delivered at its destination. A partition for dry materials is formed by a wall 6, this compartment serving for the reception of cans, paper, or other waste material.

The walls 15 which are hinged to the bed of the vehicle are provided with arms 18 by means of which said walls may assume any position between a vertical plane and a plane horizontal or parallel with the bed of the vehicle, the travel of said walls being controlled by a plurality of notches 19, which notches are engaged by a lug 20 fixed to the forward wall 17 and rearward wall 16 of the bed. The curvature of said arm is such as to allow said walls to assume a position parallel with said bed 8, further travel of said walls being prevented by the limitation of said arms. By the use of these arms 18 the walls may be brought at any angle within the two angles mentioned, by employing levers 21 which extend in a vertical position up and beyond the forward wall of the bed, and which are bent at right angles beneath said bed to the extreme rear portion thereof, where they are again bent upward and outward upon themselves in order to engage the notches 19 of the swinging arms 18, thus facilitating the operation of these walls by the driver of the vehicle, or in case a mechanical dump is used to dump the contents from said vehicle-bed, to remove the disadvantage of operating a plurality of levers. The said lever 21 is provided with a shoulder or extension 22 midway of its length, said extension or shoulder serving to enter the notches 19 provided in the arms 18 fixed to the walls of the vehicle. The entire bed is tiltable upon pivot points 23, the tilting operation serving to throw said walls outwardly when their locking arms 18 have been released by the lever 21. The arms 18 are likewise provided with a shoulder 24 arranged to operate through a plurality of ribs 25 secured to the forward portion of the bed, said ribs serving to reinforce said forward portion as well as to accommodate the travel of said arms 18. When the walls have been swung to their outermost position and are parallel with the bed, the shoulder 24 engages the upper portion of the slot 24' provided in said ribs 25, and prevents any further descent of said walls. If, however, the outermost position of said wall is not desired, the travel thereof can then be limited by the movement from left to right of said lever 21, which with its shoulder impinges against the curved arm, thus impeding any further movement of said wall.

The walls 15 are separable from the bed or vehicle, the separation being effected by the removal of an elongated pintle 27 which extends through the butts of the various hinges 28, and likewise by the removal of the connecting arms 18 which are readily detached from said walls by extracting the pins 26 therefrom. The partition 6 above referred to extends from wall to wall of the vehicle-bed, and together with the rear wall 16 forms a compartment which is designed for the reception of cans and other rubbish which is free from moisture. Said partition is arranged to be seated upon the bed of a vehicle, and for this purpose is provided with a plurality of tongues 29 for engaging a plurality of openings 30 of similar conformation. Said partition 6 has a lateral hinge or guide 31, the said hinge or guide being secured to the partition 6 in any suitable manner, preferably by butts 32 provided on said guide and having a pintle 33 engaging each of said butts. The said guide is arranged to swing outwardly, the distance of its swing being controlled by a chain 34, controlling the swinging movement of said guide, and being designed for the purpose of directing the travel of the contents or whatever material may be contained within said compartment into suitable hoppers or receptacles.

In the description thus far given of the vehicle-bed and its component parts, I have referred to the same as a bed comprising walls and partitions formed therein, all of which are capable of separation from the bed, and which, when joined, form a suitable receptacle for the transportation of garbage and other liquid-containing stuffs. I will now describe a container which is designed to be used in connection with my said bed, which container is inserted between the walls of the bed and the partition 6 which forms the dry compartment for dry materials. This container is made of any suitable material, preferably impervious, for the prevention of percolation as well as saturation therethrough, which would be the case were the parts made of materials capable of taking up the moisture. Having specific reference to the same, 7 designates said container which consists of a metallic walled structure, one side thereof being provided with a plurality of wings 35, each hinged in like manner to the body of the container as the wing 31 of the partition 6. The travel of these wings is likewise limited by chains 36 which are secured to said wings and to one wall of the container. Partition 37 is arranged to divide said container into two separate chambers, this division being desirable in the case of solid fruits and crushed fruits, the solid fruits being placed in the compartment without perforations, while the crushed or bruised ones are placed in the perforated partition, whereby the juices are not allowed to waste but are caught and gathered up. The bottom 38 of said container is provided with a plurality of openings or perforations 39 which register, or nearly so, with the perforations provided in the lining of the bed, thereby permitting the juices or liquids to escape from the container into the receptacle designed for the storage of these liquids in the bottom of said bed. While I have shown the bottom of said container to be perforated throughout, it may be undesirable in some instances to have such an arrangement for the reason that should it be necessary to transport, as before stated, bruised as well as solid fruits, their separation is not only desirable, but necessary. A plurality of hooks 40 are fastened to said container, these hooks serving to secure the container in its proper position and to engage the walls which adjoin the walls of said container. From the above description it will be perfectly apparent that said container 7 as well as the walls 15, 16, and the partition 6, are separable from the bed of the vehicle, thus making out of the bed a vehicle-platform which can then be used for transporting or carrying articles of manufacture, such as iron or steel rails, etc.

The invention with all of its parts forms a combination wagon used for dumping purposes, and with this object in view, pivot pins 23 are provided on the bottom of the bed seated in suitable fulcrums on either side of the vehicle bed, thus permitting of a reversely-tiltable movement of the bed independent of its support. The tilting of the same may be accomplished by a hoist, winch, or in any other suitable manner; or the bed itself, with its component parts may be placed upon any automatic dump and there be relieved of its contents.

Referring again to the wings 35 which are hinged to the container 7, it will be noted that said wings are within the walls 15 of the bed, said walls serving to hold the wings 35 normally closed. When the wagon is tilted, levers 21 are operated so as to release the curved arms 18, and consequently the walls, which thereupon swing outwardly by reason of their own weight and likewise permit the wings 35 to open, whereby the contents of the container are discharged into suitable troughs, the guide-wings 35, when open, extending over the wall 15 and forming a passage-way for the discharging contents.

As shown in Fig. 2 of the accompanying drawings, a plurality of troughs or hoppers 41 are stationed in the path of the discharge, the guides preventing the emptying of the contents of said container in any other direction but the one controlled by said guide-wings.

In the construction illustrated in the various figures, a container has been shown having wings on but one side. This arrangement, however, may be modified so as to include wings on both sides of the container for the purpose of avoiding the trouble incident to the turning of the bed to that particular side which has the discharge outlets, in case such outlets should be provided on but one side.

A cover 42 is provided to cover the bed of the vehicle, the cover being arranged to be swung upwardly and backwardly by means of the pivotal pins 43. The cover is likewise designed to rest on the adjoining cover on the opposite side of the bed, but spaced therefrom by suitable braces, as shown at 44.

The entire vehicle-bed, as illustrated and shown in the drawings, may be made of any material which is capable of withstanding the strain of the contents placed therein; that is to say, it may be made of sheet metal, iron, steel, or any other stout material. The covers 42 provided in said vehicle-bed are removable as well as interchangeable. Now in order to increase the carrying capacity of the vehicle I provide pins in the outer edges of said cover, as shown at 45, which pins are arranged to engage grooves or seats 46. By means of these pins said cover may be thrown in a position parallel with swinging wall 15 of the bed, this position of the cover being retained by suitable braces or bars 47. This arrangement is adapted for use in transportation of loose and bulky material, such as paper, shavings, etc.

What I claim and desire to secure by Letters-Patent of the United States is:—

1. The combination with a bed and a support therefor, of a tank carried by said bed having an outlet, walls hinged to said bed having an outward travel, a container carried by said bed having a perforated bottom and communication with said tank, guides mounted on said container, means for limiting the movement of said guides, and a dry compartment on said bed and adjacent said container.

2. A vehicle bed comprising a body portion having a central opening extending longitudinally thereof and a lining fitting in said body portion and extending over said opening, said lining being perforated to allow of the drainage of liquid, and a tank fixed to the bottom of said body portion and in line with the opening, said tank being adapted to receive the drainage from the body portion, and a drain pipe connected with said tank.

3. A vehicle bed comprising a body portion having an opening provided centrally thereof and extending longitudinally therethrough, a lining in said body portion, said lining being perforated to permit of drainage, and a tank connected with the bottom of said body portion having a sloping bottom, and a drain-pipe at the point of intersection of the sloping bottom.

4. A vehicle bed comprising a body portion having united therewith a tank, said tank extending downwardly and away from the body portion of the bed and provided with a sloping bottom, a drain-pipe at the terminus of the slope, and a container having perforations in the bottom and arranged to be placed on said body portion.

5. A vehicle bed comprising a body portion having a perforated lining and walls hingedly secured to said bed, said bed having united with the bottom thereof, a tank extending downwardly away from the bottom of the same and provided with a sloping bottom, a drain pipe at the terminus of the slope, a lever extending lengthwise of said vehicle body and arranged to cause said walls to open and close.

6. The combination with a bed having a perforated bottom and a support therefor, said bed being tiltable with respect to said support, of a tank fixed to said bed and extending downwardly and away from the bottom thereof and having a drain pipe, a container carried by said bed having a perforated bottom and communicating with said tank, whereby liquids contained in the contents of said container are drained.

7. A vehicle bed comprising a body portion having an opening provided centrally thereof, a lining in said bed, said lining being perforated, a tank in line with the opening in said bed, a drain-pipe carried by said tank, a container carried by and arranged to be placed on said bed and having perforations, said container consisting of a body having doors hingedly secured thereto and adapted to swing outwardly and away from the body thereof and discharge to suitable troughs.

8. A vehicle bed comprising a body portion having a perforated lining and an opening in the bottom of said bed extending longitudinally thereof, a tank fixed to said body portion and in line with the perforations in said lining, a drain-pipe carried by said tank, and a container adapted to be placed on the bed of the vehicle, said container having a perforated bottom and lateral doors arranged to swing outwardly to discharge the contents of the container into suitable receptacles.

In testimony whereof, I have hereunto set my hand at Los Angeles, California this 4th day of April 1906.

TIMOTHY CARROLL.

In presence of—
  ANTON GLOETZNER, Jr.,
  JAMES R. TOWNSEND.